(12) United States Patent
Kuroda et al.

(10) Patent No.: US 11,982,309 B2
(45) Date of Patent: May 14, 2024

(54) BALL SEAT, BALL JOINT, AND METHOD FOR PRODUCING BALL JOINT

(71) Applicant: NHK SPRING CO., LTD., Kanagawa (JP)

(72) Inventors: Shigeru Kuroda, Kanagawa (JP); Yuya Nagata, Kanagawa (JP)

(73) Assignee: NHK SPRING CO., LTD., Kanagawa (JP)

( * ) Notice: Subject to any disclaimer, the term of this patent is extended or adjusted under 35 U.S.C. 154(b) by 237 days.

(21) Appl. No.: 17/627,300

(22) PCT Filed: Jul. 13, 2020

(86) PCT No.: PCT/JP2020/027240
§ 371 (c)(1),
(2) Date: Jan. 14, 2022

(87) PCT Pub. No.: WO2021/010374
PCT Pub. Date: Jan. 21, 2021

(65) Prior Publication Data
US 2022/0243761 A1    Aug. 4, 2022

(30) Foreign Application Priority Data
Jul. 17, 2019    (JP) .................................. 2019-131554

(51) Int. Cl.
*F16C 11/06*    (2006.01)

(52) U.S. Cl.
CPC ...... *F16C 11/0623* (2013.01); *F16C 11/0685* (2013.01)

(58) Field of Classification Search
CPC ..... Y10T 403/32737; Y10T 403/32713; Y10T 403/32631; Y10T 403/32803;
(Continued)

(56) References Cited

U.S. PATENT DOCUMENTS

| | | | |
|---|---|---|---|
| 5,427,467 A * | 6/1995 | Sugiura | F16C 11/0685 403/140 |
| 6,736,565 B2 * | 5/2004 | Tamatsu | F16C 11/0638 29/898.047 |

(Continued)

FOREIGN PATENT DOCUMENTS

| | | |
|---|---|---|
| JP | H6-117429 A | 4/1994 |
| JP | H7-54835 A | 2/1995 |

(Continued)

OTHER PUBLICATIONS

Written Opinion in International Patent Application No. PCT/JP2020/027240, dated Sep. 24, 2020, along with an English translation thereof.

(Continued)

*Primary Examiner* — Daniel J Wiley
(74) *Attorney, Agent, or Firm* — Greenblum & Bernstein, P.L.C.

(57) ABSTRACT

A ball joint includes: a ball stud including a stud portion having one end portion connected to a structural member and another end portion, to which a ball portion is integrally joined; a housing made of metal and configured to support the ball portion to allow swinging and rotating movement of the ball portion; and a ball seat made of plastic and interposed between the housing and the ball portion. The ball seat includes a plurality of protrusions jutting out from the ball seat and inserted into a plurality of through holes formed in a bottom portion of the housing. The protrusions having pierced through the through holes are staked at their distal portions. The protrusion of the ball seat has a large diameter portion, whose diameter is larger than an inner diameter of the through hole, at its proximal portion proximal from the distal portion thereof.

12 Claims, 5 Drawing Sheets

(58) Field of Classification Search
CPC ..... Y10T 403/32721; Y10T 403/32778; F16C 7/08; F16C 11/0623; F16C 11/06; F16C 11/0685; F16C 11/0638
See application file for complete search history.

(56) References Cited

U.S. PATENT DOCUMENTS

| | | | | |
|---|---|---|---|---|
| 7,134,801 | B2* | 11/2006 | Kuroda | B60G 7/001 403/50 |
| 8,550,741 | B2* | 10/2013 | Kuroda | F16C 11/0685 403/135 |
| 8,657,520 | B2* | 2/2014 | Kuroda | F16C 11/0685 403/135 |
| 8,864,155 | B2* | 10/2014 | Kuroda | F16C 11/0685 29/527.1 |
| 9,393,850 | B2* | 7/2016 | Kuroda | B29C 45/0005 |
| 10,415,633 | B2* | 9/2019 | Kuroda | F16C 11/0647 |
| 2002/0146277 | A1* | 10/2002 | Kuroda | B60G 21/0551 403/135 |
| 2003/0049072 | A1* | 3/2003 | Tamatsu | F16C 11/0638 403/133 |
| 2011/0150563 | A1* | 6/2011 | Kuroda | F16C 11/0685 29/527.1 |
| 2012/0301213 | A1* | 11/2012 | Kuroda | F16C 11/0685 403/122 |
| 2013/0033016 | A1* | 2/2013 | Kuroda | F16J 3/042 280/124.106 |
| 2013/0328284 | A1 | 12/2013 | Byrnes | |
| 2016/0265584 | A1* | 9/2016 | Ichikawa | F16C 11/0623 |
| 2018/0252258 | A1* | 9/2018 | Kuroda | F16C 11/0638 |
| 2019/0217679 | A1* | 7/2019 | Kuroda | B60G 21/055 |

FOREIGN PATENT DOCUMENTS

| | | |
|---|---|---|
| JP | 3168229 B2 | 5/2001 |
| JP | 2009-68554 A | 4/2009 |
| JP | 2010-65725 A | 3/2010 |
| JP | 2018-135909 A | 8/2018 |
| KR | 20150027784 A | 3/2015 |

OTHER PUBLICATIONS

International Search Report issued in International Patent Application No. PCT/JP2020/027240, dated Sep. 24, 2020, along with an English translation thereof.
Extended European Search Report in counterpart EP Application No. 20839840.4, dated Jul. 10, 2023.
Office Action in counterpart Korean Application No. KR10-2022-7001280, dated Jan. 18, 2024 (and translation thereof).

* cited by examiner

BALL SEAT, BALL JOINT, AND METHOD FOR PRODUCING BALL JOINT

TECHNICAL FIELD

The present invention relates to a ball seat used in a ball joint that is provided on each side of a stabilizer link configured to connect a suspension for reducing an impact transmitted from a road surface to a vehicle and a stabilizer, the ball joint, and a method for producing the ball joint.

BACKGROUND ART

A suspension of a vehicle reduces an impact transmitted from a road surface to a vehicle body, and a stabilizer increases a roll rigidity (rigidity against torsion) of the vehicle body. The suspension and the stabilizer are connected through a stabilizer link. The stabilizer link includes a rod-like support bar and ball joints equipped on both ends of the support bar.

Figure 8:
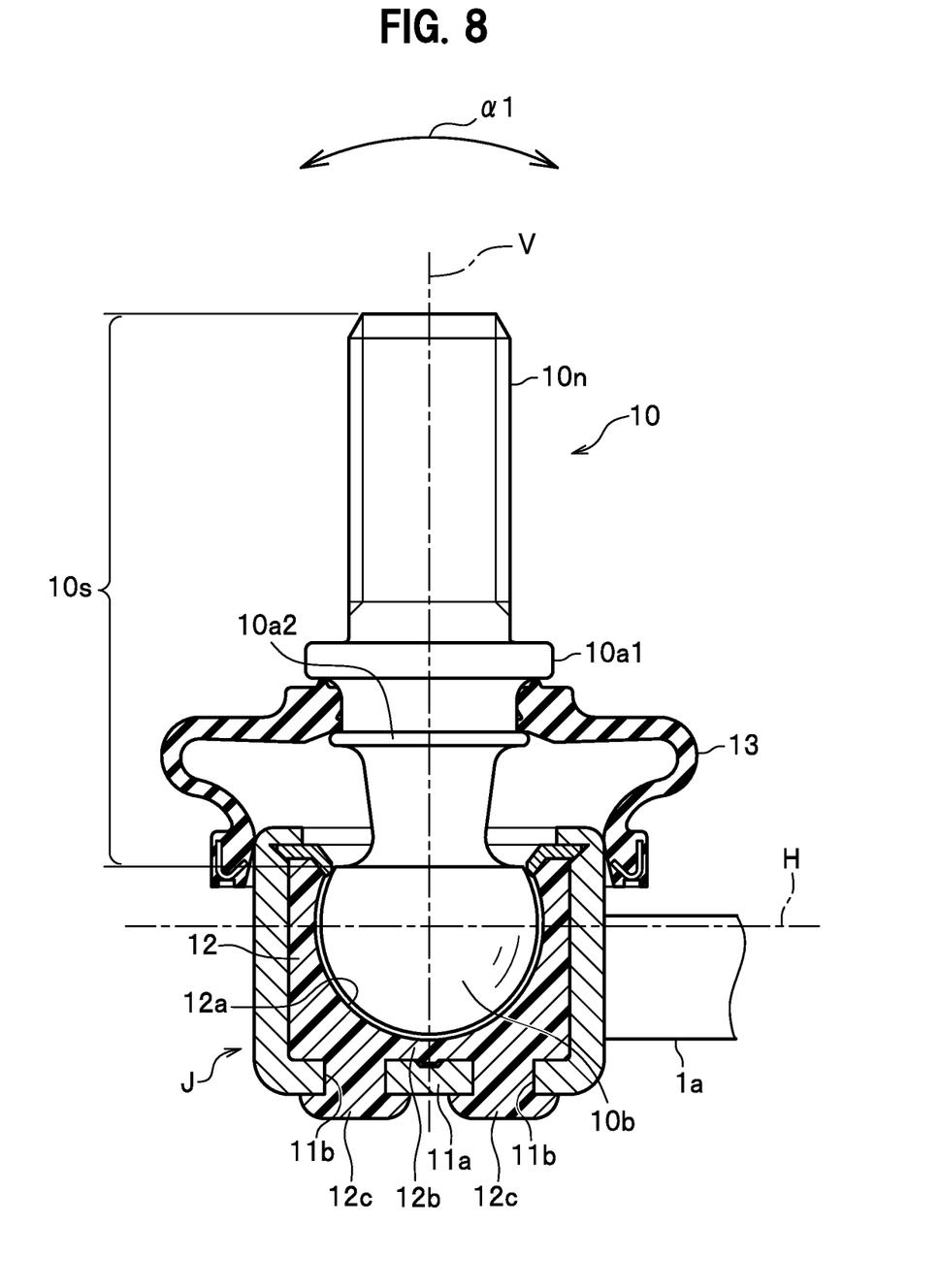
FIG. 8 is a longitudinal cross-sectional view showing a conventional ball joint.

This type of ball joint is known, for example, from Patent Document 1. As shown in FIG. 8, this ball joint J includes a ball portion 10b of a metal ball stud 10 rotatably received (accommodated) in a cup-shaped housing 11 made of metal through a plastic ball seat 12.

The ball stud 10 includes a spherical ball portion 10b integrally connected to one end of a rod-like stud portion 10s. The stud portion 10s has a male thread 10n, and a flange portion 10a1 and a small flange portion 10a2 are formed spaced apart on a side distal from the male thread 10n (toward the ball portion 10b) to extend circumferentially around the stud portion 10s. A dust cover 13 is disposed between the flange portion 10a1 and an upper end of the housing 11. An iron link 13a is press-fitted and fixed to a connecting portion at which the dust cover 13 is connected to the upper end of the housing 11.

A metal support bar 1a is fixed to an outer peripheral surface of the housing 11. When the support bar 1a is directed horizontal along the horizontal line H, as shown by the vertical line V, the axial center of the ball stud 10 is vertical to the horizontal line H.

The ball seat 12 that accommodates the ball portion 10b is fixed by staking via a C-shaped stopper ring 14 (also called as a ring 14) at an upper end portions 11a that is bent by 90° against an upright body portion 11b of the housing 11. The upper end portion of the ball seat 12 is shaped with a tapered surface that inclines from a flat surface toward an inner circumference. The ring 14 is shaped with a flat surface and a tapered surface 14a that cover the upper end portion of the ball seat 12. The inclination angle of the tapered surface 14a is set to an angle that satisfies a predetermined swinging angle of the ball stud 10 when the ball stud 10 swings (see arrow α1).

The inner surface of the housing 11 has a straight longitudinal wall in cross-section, and the ball seat 12 is accommodated in this inner surface. The inner surface of the ball seat 12 is shaped to have a spherical curved surface 12a that follows the spherical shape of the ball portion 10b. This spherical curved surface 12a is also referred to as a ball seat inner spherical surface 12a or an inner spherical surface 12a.

The bottom portion 11a of the housing 11 has a plurality of through holes 11b. The bottom portion 12b of the ball seat 12 has a plurality of protrusions 12c each protruding along the vertical line V. The number of protrusions 12c is the same as that of the through holes 11b, and the protrusions 12c are arranged at the same intervals with the through holes 11b. Each protrusion 12c has a rod-shape and is inserted into the through hole 11b. The distal end portion of the protrusion 12c having been inserted through the through hole 11b is subject to staking into an enlarged shape. In other words, the protrusions 12c are fitted into the through holes 11b and fixed thereto by staking.

Figure 9:
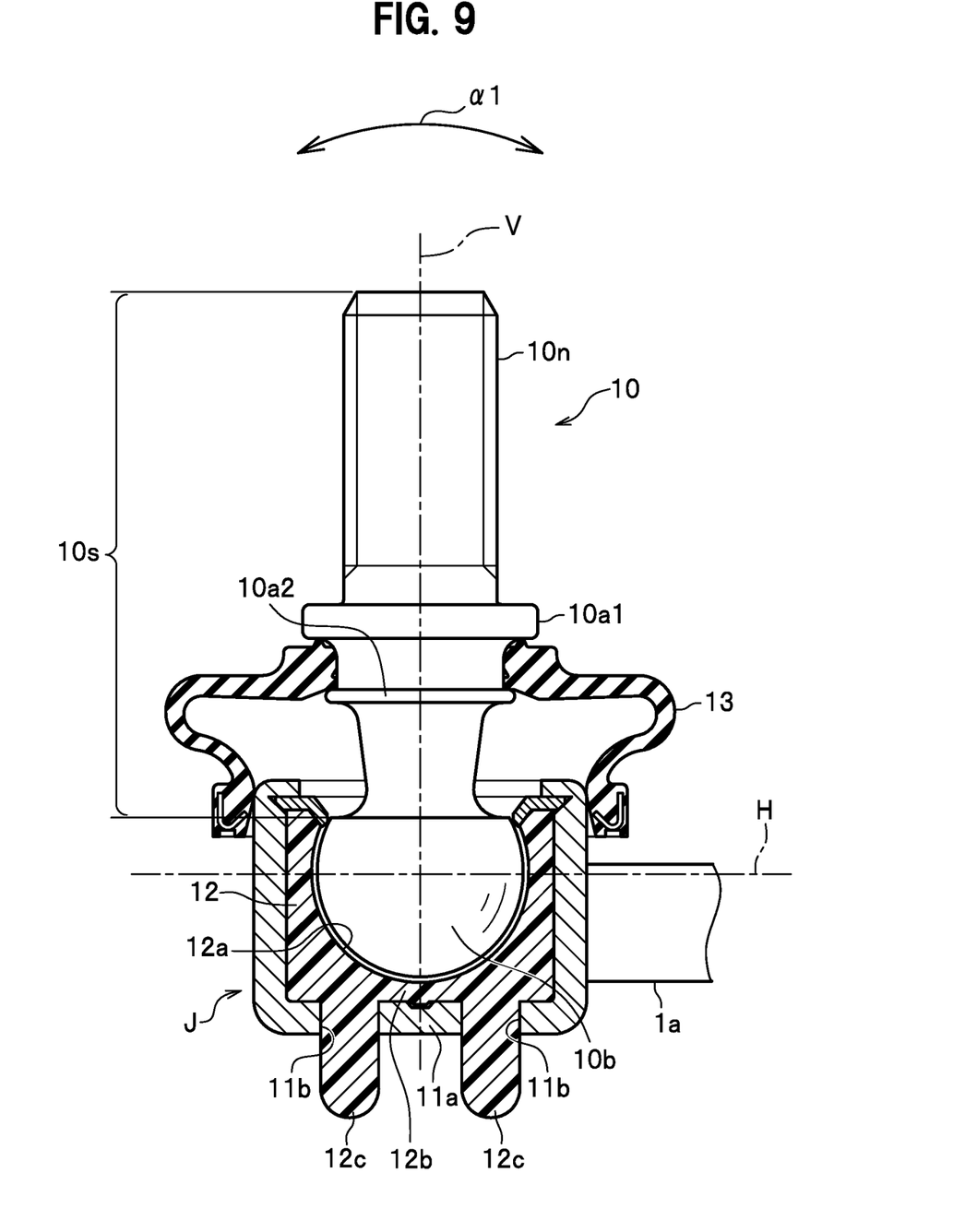
FIG. 9 is a longitudinal cross-sectional view showing protrusions of a ball seat of the conventional ball joint.

Before staking, as shown in FIG. 9, the protrusion 12c is inserted through the through hole 11b and extends straight along the vertical line V. The protrusion 12c having been inserted through the through hole 11b and protruding out from the housing 11 is heat staked at its rod-like portion into an enlarge shape as shown in FIG. 8.

In this ball joint J, the ball portion 10b swings and slides in the ball seat inner spherical surface 12a as the suspension of the vehicle strokes, and characteristics of this swinging and sliding motion can be defined as a swing torque and a rotating torque (also referred to as torques). When the frictional force of the rotating ball portion 10b against the inner spherical surface 12a increases and the torques increases accordingly, this will result in deterioration of the ride comfort.

Decreasing the tightening allowance of the ball seat 12 against the ball portion 10b within the housing 11 can reduce the respective torques. However, this will at the same time cause an increase in the amount of elastic lift. The amount of elastic lift indicates the amount of movement of the ball portion 10b within the housing 11 through the ball seat 12. If the amount of elastic lift becomes large, the ball portion 10b moves significantly within the housing 11 through the ball seat 12. This will cause rattling in the ball joint J and thus lead to abnormal noise during traveling of the vehicle. In other words, there is a trade-off between torques and the amount of elastic lift such that if the torques decrease, the amount of elastic lift increases.

CITATION LIST

Patent Literature

Patent Literature 1: Patent No. 3168229

SUMMARY OF INVENTION

Technical Problem

The ball seat 12 as described above is a plastic part manufactured by injection molding. The width of the ball seat 12 is not constant and tapers due to the effect of heat shrinkage during the molding. On the other hand, the inner wall of the housing 11 is straight, and the shape of the inner wall is different from the tapered outer wall of the ball seat 12. Therefore, the tapered outer wall of the ball seat 12 and the straight inner wall of the housing 11 are brought into local contact, which leads to a decrease in the tightening allowance and an increase in the amount of elastic lift. As the amount of elastic lift increases, the protrusion 12d of the ball seat 12 having been fitted into the through hole 11b of the housing 11 loosens, which will disadvantageously lead to a decrease in pull-out strength (stud pull-out strength) of the ball stud 10. Decreasing the stud pull-out strength may cause rattling in the ball joint J, which may lead to abnormal noise during traveling of the vehicle or the ball stud 10 coming off from the housing 11.

The present invention has been made in view of this background, and it is an object of the present invention to provide a ball seat and a ball joint, which can improve the stud pull-out strength of a protrusion of the ball seat that is fitted into a through hole formed in a bottom portion of a housing, and a method for producing the ball joint.

Solution to Problem

To solve the above-described problem, the present invention provides a ball seat used in a ball joint, the ball joint comprising: a ball stud including a stud portion having one end portion connected to a structural member and another end portion, to which a spherical ball portion is integrally joined; a housing made of metal and configured to support the spherical ball portion of the ball stud to allow swinging and rotating movement of the spherical ball portion, the housing having a space that opens to one side thereof; and a ball seat made of plastic and interposed between the housing and the spherical ball portion, the ball seat including a plurality of protrusions jutting out from the ball seat and inserted into a plurality of through holes formed in a bottom portion of the housing, wherein the protrusions having pierced through the through holes are staked at their distal portions, and a protrusion has a large diameter portion, whose diameter is larger than an inner diameter of a through hole of the housing, at its proximal portion proximal from a distal portion thereof.

The present invention also provides a ball joint comprising: the ball seat as described above, wherein the large diameter portion of the protrusion of the ball seat is inserted, while compressed, through the through hole of the housing.

The present invention further provides a method for producing a ball joint, the ball joint comprising: a ball stud including a stud portion having one end portion connected to a structural member and another end portion, to which a spherical ball portion is integrally joined; a housing made of metal and configured to support the spherical ball portion of the ball stud to allow swinging and rotating movement of the spherical ball portion, the housing having a space that opens to one side thereof; and a ball seat made of plastic and interposed between the housing and the spherical ball portion, the ball seat including a plurality of protrusions jutting out from the ball seat and inserted into a plurality of through holes formed in a bottom portion of the housing, wherein the protrusions having pierced through the through holes are staked at their distal portions, and a protrusion has a large diameter portion, whose diameter is larger than an inner diameter of a through hole of the housing, at its proximal portion proximal from a distal portion thereof, the method comprising the steps of: inserting the large diameter portion, while compressed, through the through hole of the housing, and protruding the distal portion of the large diameter portion having been inserted through the through hole outward from the through hole toward outside of the housing.

Advantageous Effects of Invention

According to the present invention, it is possible to improve the stud pull-out strength of the protrusion of the ball seat that is fitted into the through hole formed in the bottom portion of the housing.

DESCRIPTION OF EMBODIMENTS

One embodiment of the present invention will be described below with reference to the drawings. Corresponding constituent elements are denoted by the same reference signs throughout the description and the drawings, and explanations thereof will be omitted where appropriate.

Embodiment

Figure 1:
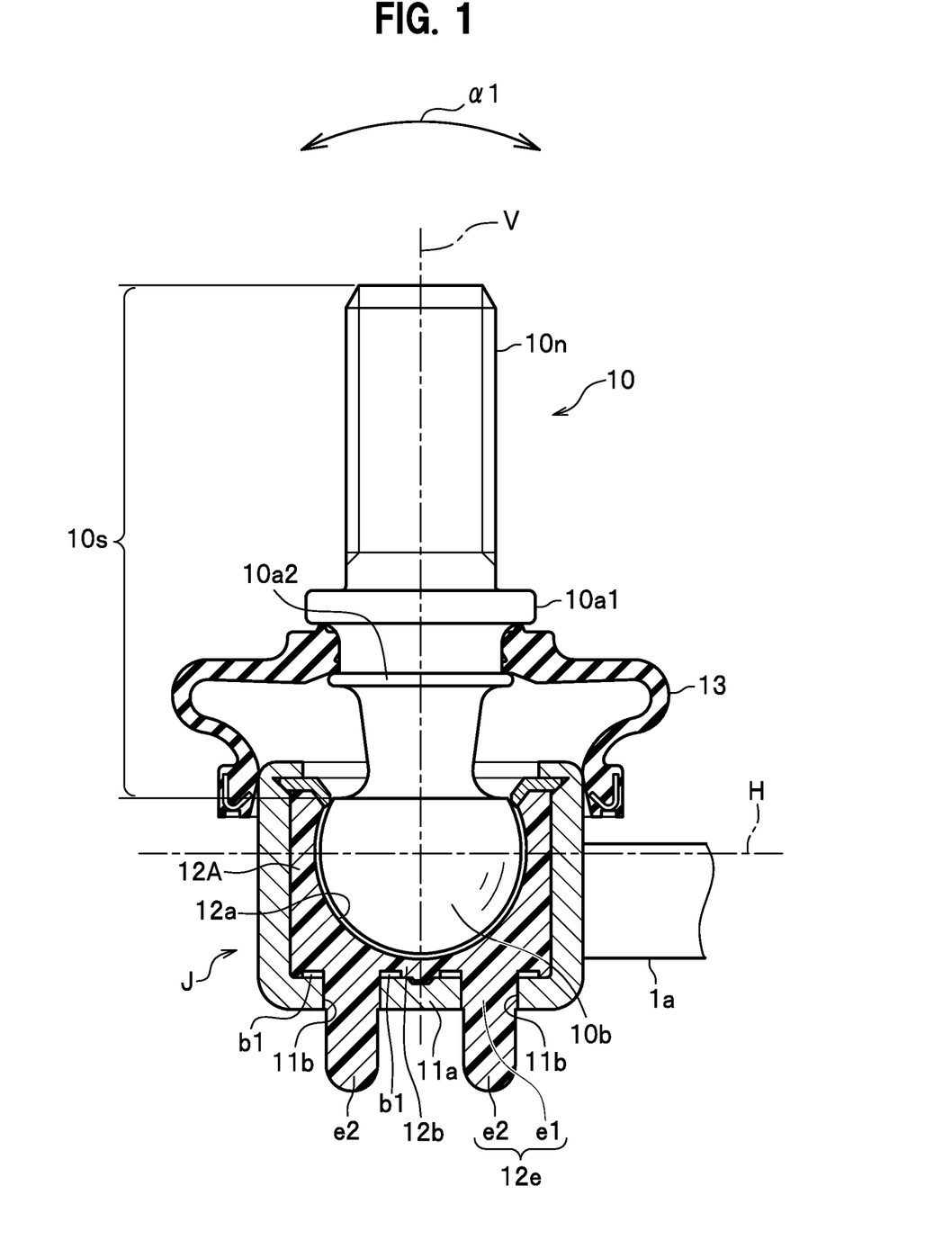
FIG. 1 is a longitudinal cross-sectional view showing the configuration of a ball joint according to one embodiment of the present invention.

FIG. 1 is a longitudinal cross-sectional view showing the configuration of a ball joint according to one embodiment of the present invention.

It should be noted that a stud portion 10s of a ball joint J1 shown in FIG. 1 is fixed to a suspension or a stabilizer as described above. The suspension or the stabilizer constitutes a structural member described in the claims. In the ball joint J1 shown in FIG. 1, a distal side of the stud portion 10s corresponds to an "upward" side, and a bottom side of a housing 11 corresponds to a "downward" side.

The ball joint J1 shown in FIG. 1 is different from the conventional ball joint J (see FIG. 9) in that a rod-like protrusion 12e of the ball seat 12A has a large diameter portion e1, whose diameter is larger than an inner diameter of a through hole 11b of the housing 11, at its proximal portion proximal from a distal portion e2 thereof, and further in that the large diameter portion e1 provided on a bottom portion 12b of the ball seat 12A is surrounded by a pool portion b1 that is recessed with a predetermined width and circulates around the large diameter portion e1.

Figure 2:
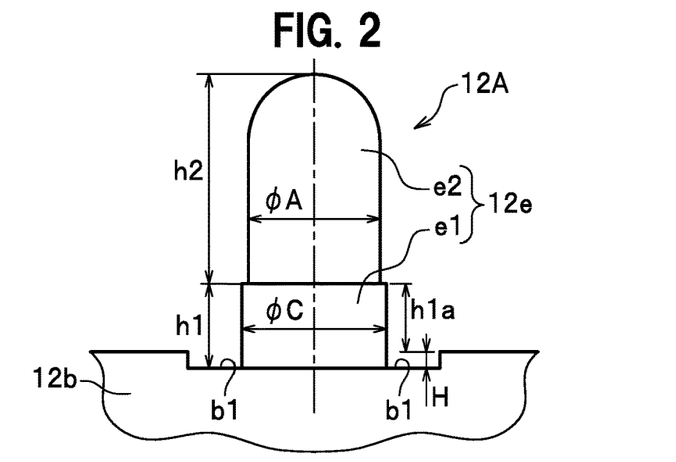
FIG. 2 is an enlarged side view showing a distinctive configuration of a ball seat of the ball joint according to this embodiment.

FIG. 2 is an enlarged side view showing the above-described distinctive configuration of the ball seat 12A. It should be noted that when the ball seat 12A shown in FIG. 2 is actually assembled into the ball joint J1, protrusions 12e are directed upside down from the direction shown of FIG. 1. The same is true for FIGS. 3 to 7 to be described later.

As seen in FIG. 2, the protrusion 12e includes a cylindrical rod-shaped distal portion e2 whose height is h2 and whose diameter is $\phi A$, and a cylindrical large diameter portion e1 whose height is h1 and whose diameter is $\phi C$ larger than $\phi A$. The depth of a recess-shaped pool portion b1 is H.

The housing 11, in which the ball seat 12A shown in FIG. 1 is accommodated, is made by pressing or cold forging a sheet metal such as an iron plate into a cup-shape. The number of through holes 11b formed in the housing 11 is the same as that of the protrusions 12e of the ball seat 12A, and the centers of the though holes 11b and the centers of the protrusions 12e are formed at the same intervals. The protrusions 12e protrude along the vertical line V from the bottom portion 12b of the ball seat 12A.

The ball seat 12A is made of a thermoplastic resin material such as POM (polyoxymethylene) that can be processed by heat staking. However, the ball seat 12A may be made of any thermoplastic resin material other than POM if requirements of abrasion resistance and the like of the ball seat 12A against the ball portion (spherical ball portion) 10b are satisfied.

The ball seat 12A made of POM is softened and deformed by application of heat at about 140° C. to 150° C., and retains its deformed shape when it is cooled after this deformation. Therefore, the distal portion e2 of the protrusion 12e having been inserted into the through hole 11b of the housing 11 and protruded outward therefrom can be deformed into a widened shape (see FIG. 8) by heat staking and then cooled to retain the widened shape.

Figure 3:
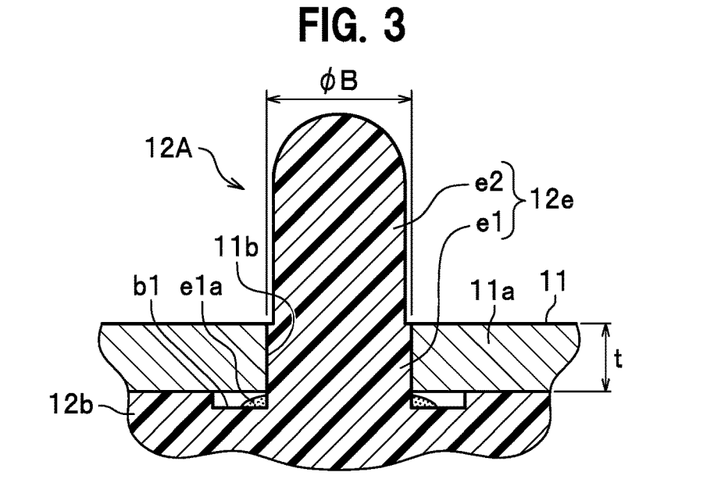
FIG. 3 is an enlarged cross-sectional view showing a through hole formed in a housing of the ball joint according to this embodiment, through which a protrusion of the ball seat has pieced.

FIG. 3 is an enlarged cross-sectional view showing a through hole 11b formed in the housing 11, through which a protrusion 12e of the ball seat 12A has been inserted and pieced.

It should be noted that the inner diameter 4B of the through hole 11b of the housing 11 is equal to or larger than the diameter φA of the distal portion e2 of the ball seat 12A (see FIG. 2) and is smaller than the diameter φC of the large diameter portion e1. Setting φA≤φB makes it possible to easily insert the distal portion e2 having the diameter φA into the through hole 11b having the inner diameter φB.

Further, setting φC>φB makes it possible to insert the large diameter portion e1, for example, having the diameter φC=4.1 mm into the through hole 11b, for example, having the inner diameter φB=4.0 mm in such a way that the large diameter portion e1 is inserted while being shaved at an entrance edge of the through hole 11b and compressed by the through hole 11b. The large diameter portion e1 is shaved and the remaining portion thereof is inevitably compressed and fitted into the through hole 11b. The frictional resistance between the large diameter portion e1 having been compressed and fitted into the through hole 11b and the inner surface of the through hole 11b can bear a part of a stud pull-out load to be described later. When the fitted large diameter portion e1 is pulled out, the diameter φC of the large diameter portion e1 is larger than the inner diameter φB of the through hole 11b. The stud pull-out load is a force (load) required to pull out the ball stud 10 from the housing 11.

Next, a pool portion b1 of the ball seat 12A collects debris e1a generated when the large diameter portion e1 is shaved at the entrance edge of the through hole 11b as described above. In other words, the pool portion b1 is sized to have a depth H sufficient to accumulate all the debris e1a.

The following equation (1) is satisfied, where H is the depth of the pool portion b1, φB is the inner diameter of the through hole 11b, φC is the diameter of the large diameter portion e1, and h1a is the length by which the large diameter portion e1 having the length (height) h1 is shaved at the entrance edge of the through hole 11b when the large diameter portion e1 is inserted into the through hole 11b for a predetermined length (height).

$$1 \leq H/\{(|\phi B - \phi C|/2) \times h1a\} \leq 2 \quad (1)$$

For example, if H=0.4 mm, |φB−φC|=0.2 mm, and h1a=2.5 mm, then H/{(|φB−φC|/2)×h1a}=1.6.

{(|φB−φC|/2)×h1a} shows the amount of shavings after the large diameter portion e1 is shaved (total amount of debris e1a). The higher the height h1 of the large diameter portion e1 or the larger the diameter φC of the large diameter portion e1, the larger the amount of debris e1a represented by the value of the above equation (1). In other words, if the diameter φC of the large diameter portion e1 is made larger and the height h1 of the large diameter portion e1 is made higher, then it is necessary that the depth H of the pool portion b1 be made deeper by that amount.

Further, if the height h1 of the large diameter portion e1 is set by the following equation (2) when the thickness of the bottom portion 12b of the housing 11 is t, all the debris e1a can be dropped and accumulated in the pool portion b1.

$$t/2 \leq h1 \leq t \quad (2)$$

If the height (length) h1 of the large diameter portion e1 is equal to the thickness t of the bottom portion 12b of the housing 11, the large diameter portion e1 does not protrude from the through hole 11b outside the housing 11. Accordingly, the distal portion e2 protruding from the through hole 11b can be easily heat staked.

The height h1 of the large diameter portion e1 may be made higher than the thickness t of the bottom portion 12b to such an extent that it does not affect heat staking. This can enhance the stud pull-out strength.

If the height h1 of the large diameter portion e1 is set to be a halfway of the height of the through hole 11b, the frictional resistance that can resist the stud pull-out load decreases. However, it is possible to adjust as desired the frictional load that can resist the stud pull-out load.

As described above, since debris e1a is accumulated in the pool portion b1, the debris e1a is not trapped between a surface of the housing 11 in which the through hole 11b is formed and a surface of the ball seat 12A in which the pool portion b1 is formed, so that both surfaces can be brought into contact without gaps.

It should be noted that among the plurality of protrusions 12e of the ball seat 12A, the number of protrusions 12e where a large diameter portion e1 is formed is set according to the stud pull-out load. The larger the stud pull-out load, the larger the number of protrusions 12e equipped with the large diameter portion e1. For example, the number of large diameter portions 12e should be increased from one to two if the stud portion 10s (see FIG. 1) can be pulled out in the case where the number of protrusions 12e equipped with the large diameter portion e1 is one.

In general, the number of protrusions 12e in the ball seat 12A is four or six, of which the large diameter portion e1 is provided on at least one of the plurality of protrusions 12e.

Method for Producing Ball Joint According to this Embodiment

An explanation is given of a method for producing the above-described ball joint J1.

First, the large diameter portion e1 of the ball seat 12A is inserted into the through hole 11b of the housing 11. At this time, the large diameter portion e1 is compressed and inserted into the through hole 11b.

Next, the distal portion e2 of the large diameter portion e1 having been inserted through the through hole 11b protrudes outward from the through hole 11b toward outside of the housing 11 by a predetermined length. This can cause the large diameter portion e1 to be fitted into the through hole 11b under high pressure.

When the large diameter portion e1 is inserted into the through hole 11b, the large diameter portion e1 is shaved and compressed by the through hole 11b. In this case, all the debris e1a generated when the large diameter portion e1 is shaved at the entrance edge of the through hole 11b is accumulated in the pool portion b1. As seen in FIG. 3, since the surface of the housing 11 in which the through hole 11b is formed and the surface of the ball seat 12A in which the pool portion b1 is formed can be brought into contact without gaps, it is possible to eliminate an insufficient press-fitting of the large diameter portion e1 into the through hole 11b.

Advantageous Effects of this Embodiment

Next, advantageous effects of this embodiment will be described below. The ball seat 12A according to this embodiment is used in the ball joint, which includes: the ball stud 10 including the stud portion 10s having one end portion connected to a structural member (suspension or stabilizer) and another end portion, to which the ball portion 10b is integrally joined; the housing 11 made of metal and configured to support the ball portion 10b of the ball stud 10 to allow swinging and rotating movement of the ball portion 10b, the housing 11 having a space that opens to one side thereof; and the ball seat 12A made of plastic and interposed between the housing 11 and the ball portion 10b. The ball seat 12A includes a plurality of protrusions 12e jutting out from the ball seat 12A and inserted into a plurality of through holes 11b formed in the bottom portion of the housing 11, and the protrusions 12e having pierced through the through holes 11b are staked at their distal portions e2.

(1) The protrusion 12e of the ball seat 12A has the large diameter portion e1, whose diameter is larger than the inner diameter of the through hole 11b of the housing 11, at its proximal portion proximal from the distal portion e2 thereof.

According to this configuration, when the large diameter portion e1 of the ball seat 12A is inserted into the through hole 11b of the housing 11, the large diameter portion e1 is compressed and inserted into the through hole 11b. By this insertion, when the distal portion e2 of the protrusion 12e penetrates from the through hole 11b by a predetermined length, the large diameter portion e1 is fitted into the through hole 11b under high pressure. This fitting generates a frictional force between the through hole 11b and the large diameter portion e1 during the pulling-out of the stud because of the repulsive force in the radial direction caused by the compressed plastic resin of the large diameter portion e1. Accordingly, the stud pull-out strength can be increased when the protrusions 12e of the ball seat 12A having been fitted into the through hole 11b of the housing 11 is pulled out.

(2) The large diameter portion e1 is provided on at least one of the plurality of protrusions 12e.

According to this configuration, the number of protrusions 12e where a large diameter portion e1 to be fitted into the through hole 11b is formed can be adjusted according to the stud pull-out load. It is therefore possible to improve the production efficiency for producing the protrusions 12e without increasing the number of unnecessary protrusions 12d having the large diameter portion e1.

(3) The large diameter portion e1 provided on the bottom portion 12b of the ball seat 12A is surrounded by the pool portion b1 that is recessed with a predetermined width and circulates around the large diameter portion e1.

According to this configuration, debris generated when the large diameter portion e1 is compressed and shaved at the entrance edge of the through hole 11b is accumulated in the pool portion b1 formed in the bottom portion 12b of the ball seat 12A. Accordingly, the debris is not trapped between the surface of the housing 11 in which the through hole 11b is formed and the surface of the ball seat 12A in which the pool portion b1 is formed, so that both surfaces can be brought into contact without gaps. This can eliminate an insufficient press-fitting of the large diameter portion e1 into the through hole 11b.

(4) The following equation (1) is satisfied:

$$1 \leq H/\{(|\phi B - \phi C|/2) \times h1a\} \leq 2$$

where H is a depth of the pool portion b1, $\phi B$ is the inner diameter of the through hole, 11b, $\phi C$ is the diameter of the large diameter portion e1, and h1a is the length by which the large diameter portion e1 is shaved at the entrance edge of the through hole 11b when the large diameter portion e1 of the protrusion 12e is inserted into the through hole 11b for a predetermined length.

According to this configuration, the higher the height h1 of the large diameter portion e1 or the larger the diameter $\phi C$ of the large diameter portion e1, the longer the length (height) h1a of the large diameter portion e1 that is shaved at the entrance edge of the through hole 11b, so that the amount of debris as the value obtained by the above equation (1) is larger. In other words, if the diameter $\phi C$ of the large diameter portion e1 is made larger and the height h1 of the large diameter portion e1 is made higher, then it is necessary that the depth H of the pool portion b1 be made deeper by that amount. Accordingly, an appropriate depth of the pool portion b1 can be obtained from the above equation (1).

(5) The large diameter portion e1 has a length equal to or greater than the thickness of the bottom portion of the housing 11.

According to this configuration, if the length of the large diameter portion e1 is equal to the thickness of the bottom portion of the housing 11, the large diameter portion e1 does not protrude from the through hole 11b outside the housing 11. This makes it possible to easily heat stake the distal portion e2 of the large diameter portion e1. Further, if the length (height) of the large diameter portion e1 is higher than the thickness t of the bottom portion to such an extent that it does not affect heat staking, the stud pull-out strength can be enhanced.

(6) The ball joint J1 according to this embodiment includes the above-described ball seat 12A, and the large diameter portion e1 of the protrusion 12e of the ball seat 12A is inserted, while compressed, through the through hole 11b of the housing 11.

According to this configuration, the large diameter portion e1 of the ball seat 12A in the ball joint J1 is fitted into the through hole 11b of the housing 11 under high pressure. This fitting generates a frictional force between the through hole 11b and the large diameter portion e1 during the pulling-out of the stud because of the repulsive force in the radial direction caused by the compressed plastic resin of the large diameter portion e1. Accordingly, the stud pull-out strength can be increased.

(7) When the large diameter portion e1 is inserted into the through hole 11b as described above in (6), while it is shaved and compressed at the entrance edge of the through hole 11b, all the debris generated when the large diameter portion e1 is shaved at the entrance edge of the through hole 11b is accumulated in the pool portion b1.

According to this configuration, since the debris of the large diameter portion e1 is accumulated in the pool portion b1, the surface of the housing 11 in which the through hole 11b is formed and the surface of the ball seat 12A in which the pool portion b1 is formed can be brought into contact without gaps. This can eliminate an insufficient press-fitting of the large diameter portion e1 into the through hole 11b.

First Modification of Embodiment

Figure 4:
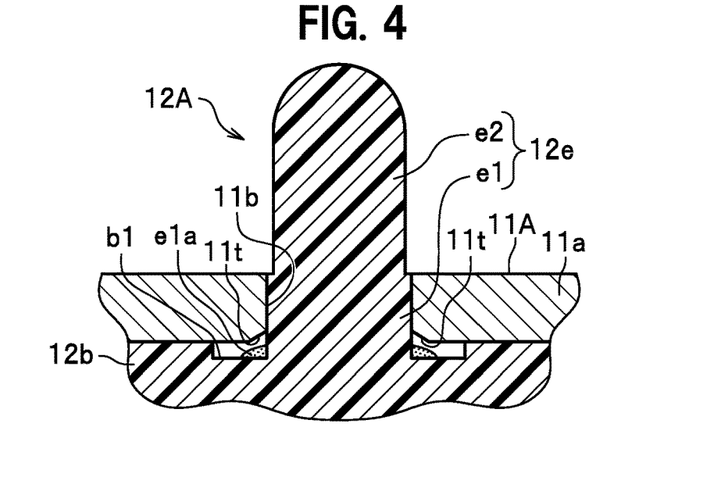
FIG. 4 is a cross-sectional view showing a tapered portion of the through hole of the housing according to a first modification of this embodiment.

FIG. 4 is a cross-sectional view showing a tapered portion of the through hole of the housing that is a distinctive configuration of the ball joint according to the first modification of this embodiment of the present invention.

The housing 11A according to the first modification as shown in FIG. 4 is different from the housing 11 as described above (see FIG. 3) in that the entrance (entrance edge) of the through hole 11b, from which the protrusion 12e is inserted, has a tapered shape 11t such that the entrance side is enlarged.

Cutting the entrance of the through hole 11b into the tapered shape 11t makes it possible to widen the angle of the entrance edge, so that the large diameter portion e1 inserted into the through hole 11b is easily compressed but not excessively shaved. In other words, since the large diameter portion e1 is shaved moderately, the pressure of the large diameter portion e1 fitted into the through hole 11b can be increased. If the large diameter portion e1 is shaved too much, the fitting pressure thereof decreases.

When the through hole 11b is cut into the tapered shape 11t, the diameter $\phi C$ of the large diameter portion e1 is made very slightly larger than the diameter $\phi B$ of the through hole 11b, so that the large diameter portion e1 can be press-fitted without being shaved. In this case, the frictional resistance that can resist the stud pull-out load can be obtained.

Second Modification of Embodiment

Figure 5:
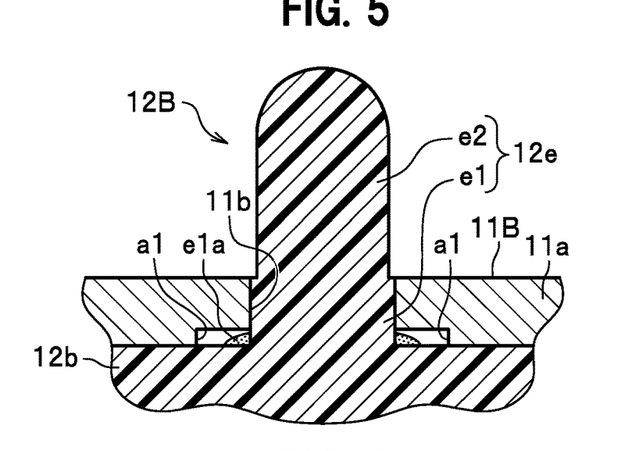
FIG. 5 is a side view showing a distinctive configuration of the housing and the ball seat of the ball joint according to a second modification of this embodiment.

FIG. 5 is a side view showing a distinctive configuration of the housing and the ball seat of the ball joint according to the second modification of this embodiment of the present invention.

Figure 6:
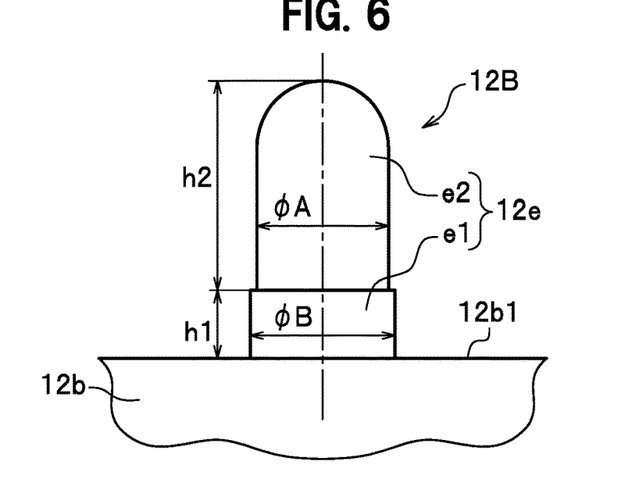
FIG. 6 is a side view showing a distinctive configuration of the ball seat according to the second modification.

The housing 11B shown in FIG. 5 is different from the housing 11 as described above (see FIG. 3) in that the surface around the through hole 11b, from which the protrusion 12e is inserted, is surrounded by a pool portion a1 that is recessed with a predetermined width and circulates around the through hole 11b. Further, as seen in FIG. 6, the surface 12b1 of the bottom portion 12b1 of the ball seat 12B, from which the protrusion 12e juts out, is made flat.

With this configuration, all the debris e1a generated when the large diameter portion e1 is shaved at the entrance edge of the through hole 11b by inserting the large diameter portion e1 into the through hole 11b is accumulated in a space formed between the bottom surface of the ball seat 12B and the pool portion a1.

Since the surface of the housing 11B in which the through hole 11b and the pool portion a1 are formed and the surface 12b1 of the bottom portion 12b of the ball seat 12A can be brought into contact without gaps, it is possible to eliminate an insufficient press-fitting of the large diameter portion e1 into the through hole 11b.

Third Modification of Embodiment

Figure 7:
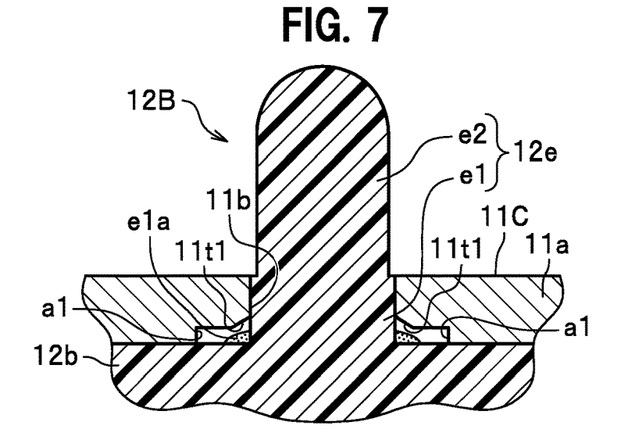
FIG. 7 is a cross-sectional view showing a tapered portion of the through hole of the housing according to the second modification.

FIG. 7 is a cross-sectional view showing a tapered portion of the through hole of the housing that is a distinctive configuration of the ball joint according to the third modification of this embodiment of the present invention.

The housing 11C according to the third modification as shown in FIG. 7 is different from the housing 11B as described above (see FIG. 5) in that the entrance of the through hole 11b, at which the pool portion a1 is formed around the housing 11C is cut into a tapered shape 11t1 such that the entrance side is enlarged.

Cutting the entrance of the through hole 11b into the tapered shape 11t1 makes it possible to widen the angle of the entrance edge, so that the large diameter portion e1 inserted into the through hole 11b is not excessively shaved. In other words, since the large diameter portion e1 is shaved moderately, the pressure of the large diameter portion e1 fitted into the through hole 11b can be increased.

When the through hole 11b is cut into the tapered shape 11t1, the diameter $\phi C$ of the large diameter portion e1 is made slightly larger than the diameter $\phi B$ of the through hole 11b, so that the large diameter portion e1 can be press-fitted without being shaved. In this case, the frictional resistance that can resist the stud pull-out load can be obtained.

Other specific configurations can be changed or modified where appropriate without departing from the gist of the present invention.

The ball joint J1 with a structure for fixing the ball seat according to the present invention is applicable to a joint part of a robot arm of a robot, such as an industrial robot and a humanoid robot, or to an equipment, such as an excavator and a crane, in which the arm is rotatable at the joint part.

REFERENCE SIGNS LIST 10 ball stud
10s stud portion
10b ball portion
10s stud portion
11, 11B, 11C housing
11a bottom portion
11b through hole
12, 12A, 12B ball seat
12b bottom portion
12b1 surface of bottom portion
12e protrusion
e1 large diameter portion
e2 distal portion
a1, b1 pool portion
e1a debris
11t, 11t1 tapered shape
J1 ball joint

The invention claimed is:
1. A ball seat used in a ball joint, the ball joint comprising:
a ball stud including a stud portion having one end portion connected to a structural member and another end portion, to which a spherical ball portion is integrally joined;
a housing made of metal and configured to support the spherical ball portion of the ball stud to allow swinging and rotating movement of the spherical ball portion, the housing having a space that opens to one side thereof; and
a ball seat made of plastic and interposed between the housing and the spherical ball portion, the ball seat including a plurality of protrusions jutting out from the ball seat, the protrusions having a proximal portion adjacent to a bottom portion of the ball seat and a distal portion distal from the bottom portion, wherein the protrusions are inserted into a plurality of through holes formed in a bottom portion of the housing, wherein the protrusions having pierced through the through holes are staked at their distal portions, and wherein at least one of the protrusions has a large diameter portion at the proximal portion thereof, whose diameter is larger than an inner diameter of a through hole of the housing.

2. The ball seat according to claim 1, wherein the large diameter portion provided on a bottom portion of the ball seat is surrounded by a pool portion that is recessed with a predetermined width and circulates around the large diameter portion.

3. The ball seat according to claim 2, wherein the following equation is satisfied:

$$1 \leq H/\{(|\phi B - \phi C|/2) \times h1a\} \leq 2$$

where H is a depth of the pool portion, $\phi$B is the inner diameter of the through hole, $\phi$C is the diameter of the large diameter portion, and h1$a$ is a length by which the large diameter portion is shaved at an entrance edge of the through hole when the large diameter portion of the protrusion is inserted into the through hole for a predetermined length.

4. The ball seat according to claim 1, wherein the large diameter portion has a length equal to or greater than a thickness of the bottom portion of the housing.

5. A ball joint comprising:

the ball seat according to claim 1, wherein the large diameter portion of the protrusion of the ball seat is inserted, while compressed, through the through hole of the housing.

6. The ball joint according to claim 5, wherein debris generated when the large diameter portion is shaved at an entrance edge of the through hole by inserting the large diameter portion, while being shaved and compressed by the through hole, is accumulated in a pool portion of the ball seat.

7. The ball joint according to claim 5, wherein an entrance edge of the through hole is cut into a tapered shape.

8. The ball joint according to claim 6, wherein the pool portion is not provided in the ball seat, but is instead provided around an entrance of the through hole of the housing.

9. A method for producing a ball joint, the ball joint comprising:

a ball stud including a stud portion having one end portion connected to a structural member and another end portion, to which a spherical ball portion is integrally joined;

a housing made of metal and configured to support the spherical ball portion of the ball stud to allow swinging and rotating movement of the spherical ball portion, the housing having a space that opens to one side thereof; and a ball seat made of plastic and interposed between the housing and the spherical ball portion, the ball seat including a plurality of protrusions jutting out from the ball seat and inserted into a plurality of through holes formed in a bottom portion of the housing, wherein the protrusions having pierced through the through holes are staked at their distal portions, and a protrusion has a large diameter portion, whose diameter is larger than an inner diameter of a through hole of the housing, at its proximal portion proximal from a distal portion thereof, the method comprising:

inserting the large diameter portion, while compressed, through the through hole of the housing, and protruding the distal portion of the large diameter portion having been inserted through the through hole outward from the through hole toward outside of the housing.

10. The method for producing a ball joint according to claim 9, wherein the large diameter portion of the protrusion jutting out from a bottom portion of the ball seat is surrounded by a pool portion that is recessed from a bottom surface with a predetermined width and circulates around the large diameter portion, and the method further comprising accumulating all debris generated when the large diameter portion is shaved at an entrance edge of the through hole of the housing by inserting the large diameter portion, while being shaved and compressed by the through hole, is accumulated in the pool portion.

11. The ball seat according to claim 1, wherein the large diameter portion is larger than an inner diameter of the through hole of the housing prior to insertion into the through hole.

12. The ball seat according to claim 1, the protrusion further comprising a smaller diameter portion, wherein the smaller diameter portion has a first diameter, the large diameter portion has a second diameter, and the second diameter is larger than the first diameter.

* * * * *